United States Patent [19]
Napier

[11] 3,824,373
[45] July 16, 1974

[54] SAFETY CIRCUIT FOR DEEP FAT FRYER

[76] Inventor: Clarence H. Napier, 1316 E. Northshore Dr., Tempe, Ariz. 85281

[22] Filed: Oct. 29, 1973

[21] Appl. No.: 410,638

[52] U.S. Cl. .............................. 219/494, 219/442
[51] Int. Cl. ............................................. H05b 1/02
[58] Field of Search ...... 219/441, 442, 494; 99/331, 99/333, 337, 403

[56] References Cited
UNITED STATES PATENTS

| | | | |
|---|---|---|---|
| 2,744,995 | 5/1956 | Jepson | 219/441 |
| 2,816,203 | 12/1957 | Weeks | 219/494 X |
| 2,847,553 | 8/1958 | Smith | 219/441 |
| 2,872,561 | 2/1959 | Humphrey | 219/441 |
| 2,907,862 | 10/1959 | Huck | 219/441 |
| 3,688,683 | 9/1972 | Boggs | 219/337 X |
| 3,720,155 | 3/1973 | Fritzsche | 219/442 X |

*Primary Examiner*—Volodymyr Y. Mayewsky
*Attorney, Agent, or Firm*—John A. Robertson

[57] ABSTRACT

A safety circuit for deep fat fryers including a plurality of electric resistance heating elements, a first set of normally open spring-biased contact switches under the control of an adjustable thermostat, and a second set of normally open spring-biased contact switches, independent of said first set, and under the control of a fixed high-limit thermostat so as to interrupt the circuit to said heating elements in the event the contacts of the first set become stuck or frozen.

9 Claims, 3 Drawing Figures

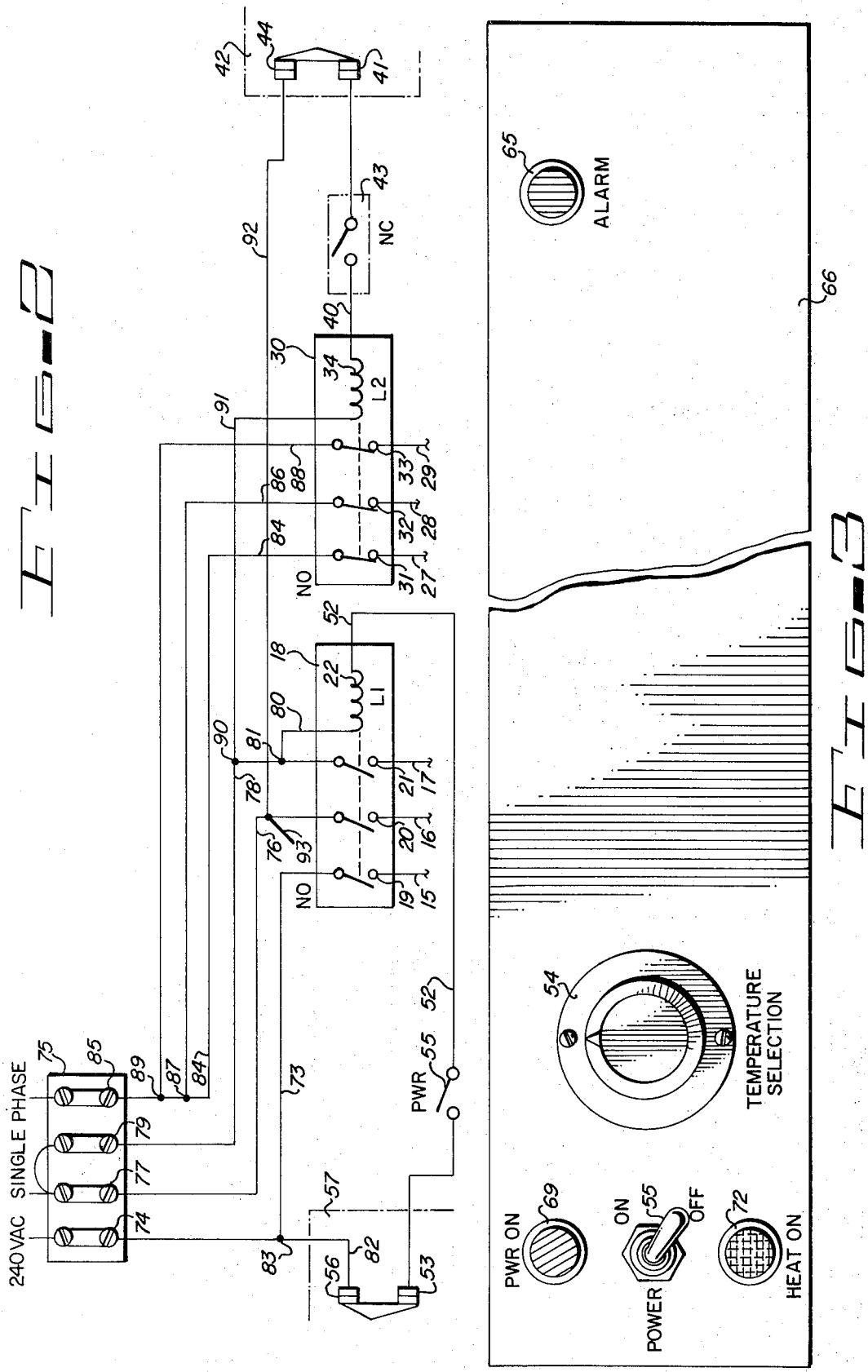

SAFETY CIRCUIT FOR DEEP FAT FRYER

The present invention relates to deep fat fryers that are heated by electric resistance heating elements, and is concerned primarily with a safety circuit that positively prevents heating of the oil or grease in the fryer beyond a pre-determined fixed temperature.

BACKGROUND OF THE INVENTION

At the present time the use of electrically heated deep fat fryers is becoming more and more widespread and particularly in institutions such as restaurants, hamburger and hot dog stands, and the like. It may be stated as a general rule that the so-called French frying operation is carried out at a temperature of about 350° F. It is now common practice to include in the circuit to the electric resistance heating elements of such a fryer a set of normally open spring-biased contacts which are under the control of an adjustable thermostat. With such a thermostat set at the desired cooking temperature, the circuit through the contact switches to the heating elements is completed. Should the temperature of the oil or grease in the fryer exceed that for which the thermostat is set, the contacts of the switch open and the circuit to the heating elements is broken. When the temperature of the oil or grease falls below that for which the thermostat is set, the contacts again close to complete the circuit. It is, therefore, evident that during the operation of a French fryer in a restaurant where its use is required at frequent intervals, the contacts of these switches open and close at frequent intervals.

While the particular cooking medium utilized in restaurants varies, it may be stated as a general rule that when the temperature of the oil or grease reaches a temperature in the order of from 400° – 500° F., the cooking medium is ignited by spontaneous combustion and a highly dangerous situation is created.

This fact has long been recognized by the manufacturers who provide French fryers for commercial institutions, and, as a result, many French fryers now in use include a high-limit thermostat which is effective on the contacts aforesaid to open them when the cooking medium reaches a pre-determined fixed temperature, in the event the adjustable thermostat fails to open these contacts. However, in view of the fact that both the adjustable thermostat and the high-limit thermostat are effective on the same set of contacts, when the latter stick or freeze, the current still flows to the heating elements to heat the cooking medium beyond the safe limit. Because of this condition, there are many instances in which the cooking medium has erupted into flame causing a fire in the premises in which it is installed.

The present invention is founded on the basic concept of providing in the circuit for the electric resistance heating elements of a deep fat fryer a second set of normally open spring-biased contact switches which are maintained closed by a solenoid and which is under the control of a fixed high-limit thermostat.

OBJECTS OF THE INVENTION

With the foregoing conditions in mind, the present invention has in view the following objectives:

1. To provide, in an electric circuit for a deep fat fryer which includes a plurality of electric resistance heating elements, a first set of normally open spring-biased contact switches and an adjustable thermostat which controls said switches, a second set of normally open spring-biased contact switches which are independent of those of said first set, together with a fixed high-limit thermostat which opens the contacts of said second set when the temperature of the cooking medium in the fryer reaches a pre-determined temperature.
2. To provide, in an electric circuit of the type noted, first and second sets of contact switches, each including a solenoid which when energized closes the contacts, with the solenoid of the second set being energized the entire time that the French fryer is plugged into an appropriate source of power, except when the fixed high-limit thermostat is effective to de-energize it.
3. To provide, in an electric circuit of the character aforesaid, a visible and/or audible alarm which is rendered effective when the solenoid of the second set of contacts is de-energized.
4. To provide, in an electric circuit of the kind described, a mercury switch between the solenoid of the second set of contacts and the fixed high-limit thermostat which is normally closed to maintain the circuit through this solenoid when the cooking apparatus is maintained in equilibrium on a desired level but which interrupts this circuit when the horizontal condition is disturbed.
5. To provide an electric circuit of the type noted which is adapted to be connected to a three-phase source of supply.
6. To provide an electric circuit of the kind described which is adapted to be connected to a single-phase source of supply.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing an electric circuit for a deep fat fryer which includes a plurality of electric resistance heating elements, with a first side of the circuit being connected to the ends of the heating elements at that side, and a second side of the circuit being connected to the other ends of the heating elements. The ends of both sides of the circuit are connected to a power receptacle which may be for either three-phase or single-phase current. A first set of normally open spring-biased contact switches are included in the first side of the circuit and are moved into circuit closing position by a solenoid under the control of an adjustable thermostat.

A second set of normally open spring-biased contact switches is included in the second side of the circuit, with the contacts being held in closed position by a solenoid which is energized the entire time that the power receptacle is connected to the source of supply. A fixed high-limit thermostat is included in the circuit of the solenoid of the second set to break the circuit thereto when a pre-determined temperature in the cooking medium is reached. A mercury switch is included in the line from the solenoid of the second set to the high-limit thermostat.

A main control switch is included in the line between the solenoid of the first set of contact switches and the adjustable thermostat. Alarms and indicating lights are connected into the circuit in a well known manner and are mounted on a panel which is included in the structure of the fryer.

For a full and more complete understanding of the invention, reference may be had to the following description and the accompanying drawings wherein:

FIG. 2 is another schematic view illustrating the wiring diagram for a single-phase source of power, with portions of the circuit which are common to that of FIG. 1 omitted, and FIG. 3 is an elevation of a panel on which the adjustable thermostat, signal lights and main control switch are mounted.

DESCRIPTION OF THE THREE-PHASE EMBODIMENT

Figure 1:
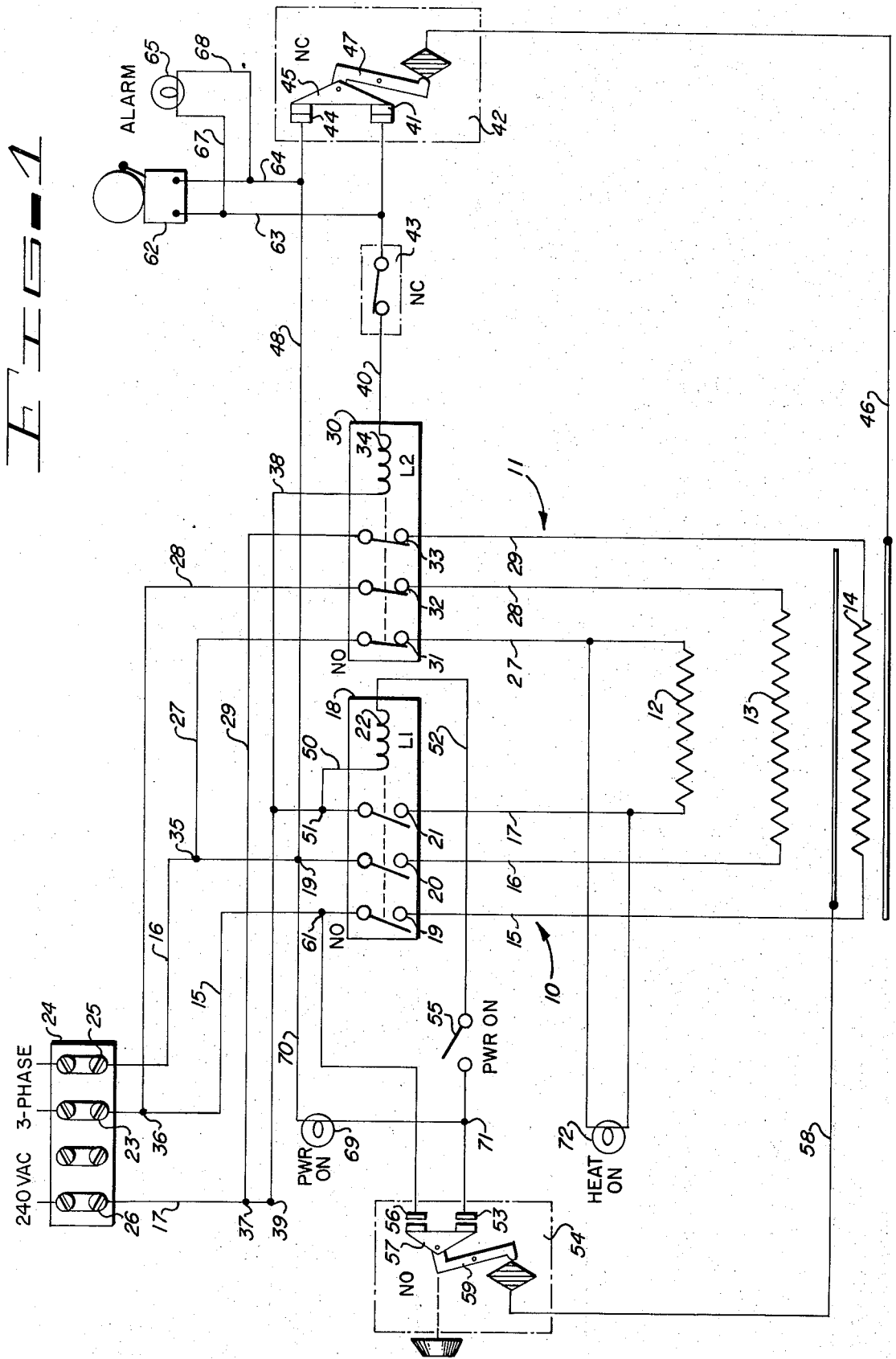
FIG. 1 is a schematic view displaying the wiring diagram of the circuit for a three-phase source of power.

Referring now to the drawings wherein like reference characters denote corresponding elements throughout the several views, and first more particularly to FIG. 1, the three-phase circuit of this invention is illustrated and described as comprising a first side designated 10 and a second side indicated at 11. Electric resistance heating elements are shown at 12, 13 and 14. Side 10 of the circuit includes lines 15, 16 and 17 which are connected to the ends of heating elements 12, 13 and 14 at that side.

A first set of normally open spring-biased contact switches is designated generally 18. Thus, a set of contacts 19 is included in line 15, another set 20, in line 16, and a third set 12, in line 17. A solenoid 22 has its armature mechanically connected to the movable elements of the three sets 19, 20 and 21 of contacts so that when the solenoid 22 is energized these contacts are closed.

At this point it is well to note that line 15 is connected to a terminal 23 of a power receptacle 24 which is connected to a three-phase source of electric current. Line 16 is connected to a terminal 25, while line 17 is connected to a terminal 26.

Side 11 of the circuit includes lines 27, 28 and 29 which are connected to heating elements 12, 13 and 14 respectively at the ends remote from their connections to the lines 15, 16 and 17. Included in the lines of side 11 is a second set of normally open spring-biased contact switches generally designated 30. Thus, a set of contacts 31 is included in line 27, another set 32 in line 28, and a third set 33 in line 29. Set 30 includes a solenoid 34, the armature of which is mechanically connected to the movable elements of contact switches 31, 32 and 33.

Line 27 is connected at point 35 to line 16, and hence to terminal 25. Line 28 is connected at point 36 to line 15, and hence to terminal 23, while line 29 is connected to line 17 at point 37, and hence to terminal 26.

Extending from one end of solenoid 34 is a line 38 which is connected to line 17 at point 39, and hence to terminal 26. From the other end of solenoid 34 extends a line 40 to a contact 41 of a fixed high-limit thermostat designated generally 42. Included in this line 40 is a mercury switch 43, which is in closed position when the apparatus in which the circuit is installed is horizontal. Thermostat 42 includes a second fixed contact 44, with the contacts 41 and 44 being connected by a bridge 45, the position of which is determined by a sensing element in the form of a mercury-filled capillary tube 46 having one end located adjacent to heating element 14 and the other end operatively connected to lever 47 of thermostat 42. From fixed contact 44 of fixed thermostat 42, a line 48 extends to a point 49 for connection to line 16. Thus, the circuit through solenoid 35 is maintained at all times that the receptacle 24 is connected to the power source, with the exception of when the fixed high-limit thermostat 42 breaks this circuit.

One end of solenoid 22 is connected by a line 50 which is connected at point 51 to line 17. The other end of solenoid 22 is connected by a line 52 to a fixed contact 53 of an adjustable thermostat 54. Included in this line 52 is a main control switch 55. Thermostat 54 includes another fixed contact 56, with the contacts 53 and 56 being connected by a movable bridge 57 which is a part of thermostat 54 and which is operated by a sensing element 58. Sensing element 58 may also be a mercury-filled capillary tube, one end of which is located adjacent to the heating elements and the other end of which is in operative engagement with a lever 59 which determines the position of bridging element 57. From fixed contact 57 a line 60 extends to a point 61 in line 15 whereby it is connected to terminal 23.

It is evident that with bridge 57 moved into position spanning fixed contacts 53 and 56 and with main control switch 35 closed, solenoid 22 is energized to close switches 19, 20 and 21. As the contact switches of set 30 are ordinarily closed by the energization of solenoid 34, current will flow through heating elements 12, 13 and 14. When the temperature for which adjustable thermostat 54 has been set is attained, or slightly exceeded, sensing element 58 will cause bridge 57 to move away from contacts 53 and 56 thereby de-energizing solenoid 22, which results in the contact switches 19, 20 and 21 opening because of their spring bias. When the set temperature is again reached, solenoid 22 will again be energized to close the contact switches of first set 18. This action is repeated during the normal use of the deep fat fryer.

An audible alarm is represented at 62. It is connected across lines 40 and 48 by lines 63 and 64. A visible alarm is indicated at 65 and may be a light of a desired color which is displayed on a panel 66 (FIG. 3). Alarm 65 is connected across lines 63 and 64 by lines 67 and 68. It is evident that when thermostat 42 is operative to interrupt the circuit through solenoid 34, the circuits to audible alarm 62 and visible alarm 65 are completed.

A signal light 69 of a desired color is included in a line 70 which extends from point 49 in line 16 to point 71 in line 52. Thus, when main control switch 55 is closed, signal light 69 is illuminated. A second signal light 72 of a desired color is connected across lines 17 and 27 and indicates when a heated condition obtains in the fryer. In this connection it is noted that solenoid 22 may in some instances be energized a short time before the contact switches in set 18 close. Thus, it is desirable to have a signal light to indicate the actual time when heating elements 12, 13 and 14 are energized.

The importance of the feature of the above described circuit resides in the fact that during ordinary periods of both use and non-use of the fryer, solenoid 34 is energized to maintain contact switches 31, 32 and 33 in closed position. These switches open only when the horizontal position of the frying apparatus is disturbed by mercury switch 43 or when the fixed high-limit thermostat 32 breaks the circuit across contacts 41 and 44.

SINGLE-PHASE EMBODIMENT

In describing the circuit for the single-phase embodiment, some of the elements which are common to the three-phase embodiment are omitted and others bear the same reference characters. Thus, a first set 18 of normally open spring-biased contact switches is included, as is a second set 30. Lines 15, 16 and 17 of side 10 extend from the same heating elements to contact switches 19, 20 and 21. Also, lines 27, 28 and 29 extend from the heating elements to contact switches 31, 32 and 33.

From switch 19, a line 73 extends to a terminal 74 of a receptacle 75 which is connected to a source of single-phase current. A line 76 extends from switch 20 to a terminal 77 on receptacle 75, and a line 78 extends from switch 21 to a terminal 79. One end of solenoid 22 is connected by a line 80 to line 78 at point 81, and hence to terminal 79. The line 52 extends from the other end of solenoid 22, includes main control switch 55, and is connected to fixed contact 53 of adjustable thermostat 54. A line 82 extends from the other fixed contact 56 of thermostat 54 to a point 83 where it is connected to line 73, and hence to terminal 74.

From switch 31, a line 84 extends to a terminal 85 on receptacle 75. A line 86 extends from switch 32 to point 87 where it is connected to line 84. Another line 88 extends from switch 33 to a point 89 where it is connected to line 84. Hence, lines 86 and 88 are connected to terminal 85.

At a point 90 in line 78, a line 91 extends to one end of solenoid 34. From the other end of solenoid 34, line 40 extends, and included therein is a mercury switch 43, with the end of line 40 being connected to a fixed contact 41 of fixed high-limit thermostat 42. From the other fixed contact 44, a line 92 extends to a point 93 in line 76, by which is it connected to terminal 77.

The operation of this embodiment of the invention is substantially the same as that of the three-phase embodiment, with emphasis being placed on the fact that solenoid 34 is always energized, except for the times when either mercury switch 43 is open or fixed high-limit thermostat 42 breaks the circuits across contacts 41 and 42.

While preferred specific embodiments are herein disclosed, it is to be clearly understood that the invention is not to be limited to the exact mechanisms, wiring and devices illustrated and described, because various modifications of these details may be provided in putting the invention into practice.

What is claimed is:

1. For use with a deep fat fryer, a safety circuit comprising:
   a. a plurality of electric resistance heating elements;
   b. a first circuit side providing a line to one end of each of said heating elements;
   c. a second circuit side providing a line to the other end of each of said heating elements;
   d. a first set of normally open spring-biased contact switches included in the lines of said first circuit side and including movable elements operated by a solenoid;
   e. the lines of said first circuit side being connected to terminals on a power receptacle that is connected to a source of electric power;
   f. said solenoid having one end connected to a terminal in said receptacle and its other end to a line extending to an adjustable thermostat, with another line extending from said thermostat to another terminal in said receptacle;
   g. a sensing element for operating said adjustable thermostat;
   h. a second set of normally open spring-biased contact switches included in the lines of said second circuit side and having a second solenoid for operating the movable elements of the contact switches of said second set;
   i. a line extending from one end of said second solenoid to a terminal of said receptacle;
   j. another line extending from the other end of said second solenoid to a fixed high-limit thermostat;
   k. a sensing element controlling the operation of said fixed high-limit thermostat, and
   l. a line extending from said fixed high-limit thermostat to a terminal other than that to which the first mentioned line connected to the solenoid is connected.

2. The electric circuit of claim 1 in which a mercury switch is included in the line between said second solenoid and said fixed high-limit thermostat.

3. The electric circuit of claim 1 in which an audible alarm is connected across the lines to said fixed high-limit thermostat.

4. The electric circuit of claim 1 in which a visible signal is connected across the lines to said fixed high-limit thermostat.

5. The electric circuit of claim 1 in which a main control switch is included in the line extending from one end of the solenoid of the first set of switches to said adjustable thermostat.

6. The electric circuit of claim 1, together with a signal light in a line extending from one of the lines of said first side to the line extending from one end of the solenoid of the first set to the adjustable thermostat.

7. The electric circuit of claim 1, together with a signal light for indicating a heat condition in the fryer and connected across one set of the lines extending to the ends of a heating element.

8. The electric circuit of claim 1 in which the power source is three-phase.

9. The electric circuit of claim 1 in which the power source is single-phase.

* * * * *